US010261376B2

(12) United States Patent
Xu

(10) Patent No.: US 10,261,376 B2
(45) Date of Patent: Apr. 16, 2019

(54) DISPLAY PANEL HAVING PERSPECTIVE FUNCTION AND ARRAY SUBSTRATE

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 189 days.

(21) Appl. No.: 15/115,899

(22) PCT Filed: Jul. 11, 2016

(86) PCT No.: PCT/CN2016/089606
§ 371 (c)(1),
(2) Date: Aug. 1, 2016

(87) PCT Pub. No.: WO2017/215057
PCT Pub. Date: Dec. 21, 2017

(65) Prior Publication Data
US 2018/0203316 A1    Jul. 19, 2018

(30) Foreign Application Priority Data

Jun. 16, 2016  (CN) .................. 2016 1 04305050

(51) Int. Cl.
*G02F 1/1362*    (2006.01)
*G02F 1/1343*    (2006.01)
(Continued)

(52) U.S. Cl.
CPC ...... *G02F 1/136286* (2013.01); *G02F 1/1362* (2013.01); *G02F 1/134336* (2013.01);
(Continued)

(58) Field of Classification Search
CPC ............ G02F 1/1362; G02F 1/136286; G02F 1/134336; G09G 3/3677; G09G 3/3688
See application file for complete search history.

(56) References Cited

U.S. PATENT DOCUMENTS

2009/0086142 A1\*  4/2009  Chen ................. G02F 1/133753
349/129
2010/0026797 A1\*  2/2010  Meuwissen ........ G02B 27/2214
348/59

(Continued)

FOREIGN PATENT DOCUMENTS

CN    102854680 A        1/2013
CN    103018941 A  \*    4/2013
(Continued)

*Primary Examiner* — Amare Mengistu
*Assistant Examiner* — Jennifer L Zubajlo
(74) *Attorney, Agent, or Firm* — Andrew C. Cheng

(57) ABSTRACT

The present disclosure discloses a display panel having a perspective function and an array substrate, the display panel comprises: a plurality pixel regions, wherein each pixel region respectively comprises a perspective region and a display region, wherein said perspective of said each pixel region is used to look the scene after the display panel, and said display region of said each pixel region is used to provide the display function. Through the above way, which can make the effects of perspective view and display diversification, to meet the multiple requirements of perspective view and display form users, and the transparent display effect can be adjusted, thereby achieving the ideal requirements of users.

14 Claims, 4 Drawing Sheets

(51) Int. Cl.
*G09G 3/36* (2006.01)
*G09G 3/00* (2006.01)

(52) U.S. Cl.
CPC ........... *G09G 3/003* (2013.01); *G09G 3/3677* (2013.01); *G09G 3/3688* (2013.01)

(56) References Cited

U.S. PATENT DOCUMENTS

2013/0050618 A1    2/2013   Lo et al.
2013/0147851 A1    6/2013   Yim et al.
2017/0217398 A1    7/2017   Cao et al.

FOREIGN PATENT DOCUMENTS

| CN | 103064221 A | * | 4/2013 |
| CN | 103487989 A | * | 1/2014 |
| JP | 2013211102 A | | 10/2013 |

\* cited by examiner

DISPLAY PANEL HAVING PERSPECTIVE FUNCTION AND ARRAY SUBSTRATE

BACKGROUND OF THE DISCLOSURE

1. Field of the Disclosure

The present disclosure relates to display technical field, and in particular to a display panel having a perspective function and an array substrate.

2. The Related Arts

A thin film transistor liquid crystal display, TFT-LCD, has advantages such as small size, low power consumption, high brightness, high contrast, and color saturation and so on, which has been the mainstream display technology in the market.

As long as the development of display technology and smart home, in addition to the conventional liquid crystal display technology, transparent display technology has become more prominent, the transparent display technology which more popular in current research is mostly active matrix organic light emitting diode, AMOLED, display technology. For some specific display requirements, liquid crystal display technology also has its own advantages, such as transparent refrigerator, car windshields, etc. The traditional transparent liquid crystal display is shown in FIG. 1, just on the basis of existing liquid crystal display, simply removing the backlight, using the ambient light to achieve the transparent display.

However, the disadvantage of this transparent display is that the effects of perspective view and display are single, and the transparent display effect is not satisfactory.

SUMMARY OF THE DISCLOSURE

The main technical issue to be solved by the present disclosure is to provide a display panel having a perspective function and an array substrate, which can make the effects of perspective view and display diversification, to meet the multiple requirements of perspective view and display form users, and the transparent display effect can be adjusted, thereby achieving the ideal requirements of users.

In order to solve the above technical issue, a technical solution adopted by the present disclosure is: to provide a display panel having perspective function, which comprises a plurality of pixel regions, wherein each pixel region respectively comprises a perspective region and a display region, wherein said perspective region of each pixel region is used to look a scene after said display panel, and said display region of each pixel region is used to let said display panel provide a display function;

Wherein it also comprises: a first substrate, which comprises: a plurality of scan lines, providing on said first substrate; a plurality of data lines, providing on said first substrate, and said plurality of data lines and said scan lines being intersected with each other in order to divide said display panel into said plurality of pixel regions; a plurality of pixel driving lines, providing on said first substrate, and said plurality of scan lines being provided in space; a second substrate, which is corresponded with said first substrate; a liquid crystal layer, which is provide between said first substrate and said second substrate; wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display;

wherein signals of said plurality of pixel driving lines are the same;

wherein said second substrate comprises: a color photoresist layer, forming on said second substrate which is corresponded with said display region of said pixel region.

Wherein pixel opening area of said perspective region is larger or equal than pixel opening are of said display region.

Wherein said each pixel region comprises: a gate electrode, which is electrically connected with a corresponded scan line; a source electrode, which is electrically connected with a corresponded data line; a drain electrode, which is electrically connected with said second pixel electrode in said pixel region.

Wherein said each pixel region further comprises: a liquid crystal capacitance, which is electrically connected with said drain electrode of said switching component.

In order to solve the above technical issue, another technical solution adopted by the present disclosure is: to provide an array substrate, which comprises a plurality of pixel regions, wherein each pixel region respectively comprises a perspective region and a display region, wherein said perspective region of each pixel region is used to look a scene after said display panel, and said display region of each pixel region is used to let said display panel provide a di splay function.

Wherein it also comprises: a plurality of scan lines; a plurality of data lines, said plurality of data lines and said scan lines being intersected with each other in order to divide said display panel into said plurality of pixel regions; a plurality of pixel driving lines, and said plurality of scan lines being provided in space; wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display.

Wherein pixel opening area of said perspective region is larger or equal than pixel opening are of said display region.

Wherein signals of said plurality of pixel driving lines are the same.

Wherein said each pixel region comprises:

a gate electrode, which is electrically connected with a corresponded scan line;

a source electrode, which is electrically connected with a corresponded data line;

a drain electrode, which is electrically connected with said second pixel electrode in said pixel region.

Wherein said each pixel region further comprises: a liquid crystal capacitance, which is electrically connected with said drain electrode of said switching component.

In order to solve the above technical issue, the other technical solution adopted by the present disclosure is: to provide a display panel having a perspective function, which comprises: a first substrate, which comprises: a plurality of scan lines, providing on said first substrate; a plurality of data lines, providing on said first substrate, and said plurality of data lines and said scan lines being intersected with each other in order to divide said display panel into said plurality of pixel regions; a plurality of pixel driving lines, providing on said first substrate, and said plurality of scan lines being provided in space; a second substrate, which is corresponded with said first substrate; a liquid crystal layer, which is provide between said first substrate and said second substrate; wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display.

Wherein signals of said plurality of pixel driving lines are the same.

Wherein said second substrate comprises:

a color photoresist layer, forming on said second substrate which is corresponded with said display region of said pixel region.

Wherein said each pixel region comprises:

a gate electrode, which is electrically connected with a corresponded scan line;

a source electrode, which is electrically connected with a corresponded data line;

a drain electrode, which is electrically connected with said second pixel electrode in said pixel region.

Wherein said each pixel region further comprises:

a liquid crystal capacitance, which is electrically connected with said drain electrode of said switching component.

The benefit of the present disclosure is: to distinguish to prior art, the display panel having perspective function of the present disclosure comprises a plurality of pixel regions, wherein each pixel region respectively comprises a perspective region and a display region, wherein said perspective region of each pixel region is used to look a scene after said display panel, and said display region of each pixel region is used to let said display panel provide a display function. Dividing the pixel region into a perspective region and a display region, the perspective region is used to look the scene after the display panel, the display region is used to provide display function, through the above way, which can make the effects of perspective view and display diversification, to meet the multiple requirements of perspective view and display form users, and the transparent display effect can be adjusted, thereby achieving the ideal requirements of users.

DETAILED DESCRIPTION OF THE PREFERRED EMBODIMENTS

The following will describe the present disclosure in detail through combining the drawings and embodiments.

Figure 2:
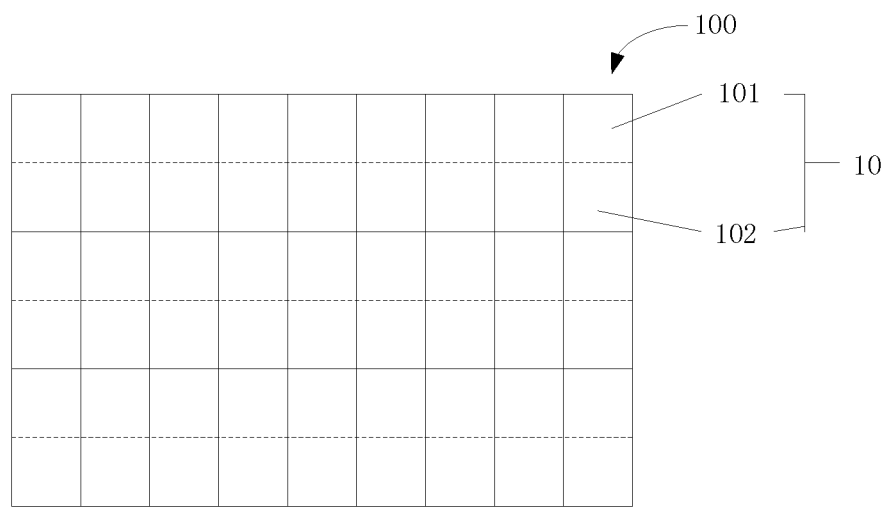
FIG. 2 is a structure diagram of an embodiment of a display panel having a perspective function of the present disclosure.

Refer to FIG. 2, FIG. 2 is a structure diagram of an embodiment of a display panel having a perspective function of the present disclosure.

The display panel 100 comprises: a plurality o pixel regions 10, wherein each pixel region 10 respectively comprises a perspective region 101 and a display region 102, wherein the perspective region 101 of each pixel region 10 is used to look a scene after the display panel 100, and the display region 102 of each pixel region 10 is used to let the display panel 100 provide a display function.

The embodiment of the present disclosure divides the pixel region into a perspective region and a display region, the perspective region is used to look the scene after the display panel, the display region is used to provide display function, for example, in the application of automotive windshield, the present disclosure also combines the left and right eye parallax display technology of 3D display, on the one hand, the user who sits in the driving position can only see the road ahead through the perspective region, on the other hand, the user who sits in the copilot position can see the image displayed through the display region, such as watching TV, video and so on. In another example, in the application of the transparent window at the mall, users can see the clothing shown in the shop window through the perspective region, in the display region can be displayed the various occasions of wearing the clothing and the collocation of the other clothing, etc. In another example, it is also possible to adjust the light transmittance of a perspective region, thereby adjusting the effect between perspective and display.

Figure 3:
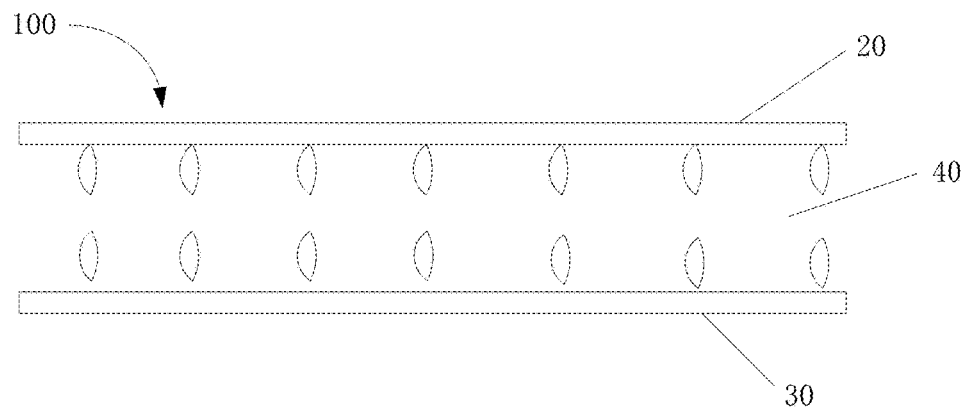
FIG. 3 is a structure diagram of the other embodiment of a display panel having a perspective function of the present disclosure.

Therefore, through the above way, which can make the effects of perspective view and display diversification, to meet the multiple requirements of perspective view and display form users, and the transparent display effect can be adjusted, thereby achieving the ideal requirements of users.

Wherein refer to FIG. 3, the display panel 100 also comprises: a first substrate 20, a second substrate 30 and a liquid crystal layer 40. The first substrate 20 and the second substrate 30 are relatively provided, the liquid crystal layer 40 is provided between the first substrate 20 and the second substrate 30.

Figure 4:
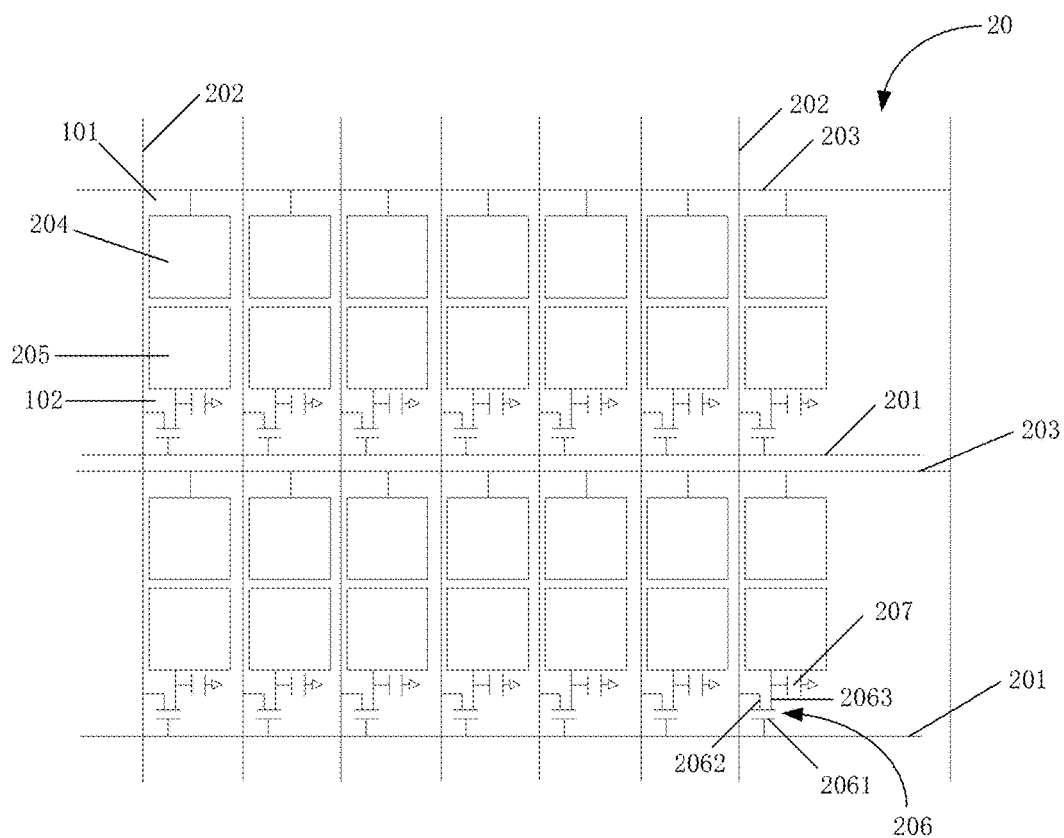
FIG. 4 is a structure diagram of a first substrate in FIG. 3.

Refer to FIG. 4, the first substrate 20 comprises: a plurality of scan lines 201, a plurality data lines 202 and a plurality of pixel driving lines 203. The plurality of scan lines 20 is are provided on the first substrate 20, the plurality of data lines 202 are provided on the first substrate 20, and the plurality of data lines 202 and the scan lines 201 are intersected with each other in order to divide the display panel into the plurality of pixel regions 10; the plurality of pixel driving lines 203 is provided on the first substrate 20, and the plurality of pixel driving lines 203 and the plurality of scan lines 201 are provided in space; combine and refer to FIG. 5, each pixel region 10 respectively comprises a perspective region 101 and a display region 102, the first pixel electrode 204 of the perspective region 10 of each pixel region 10 and the second pixel electrode 205 of the display region 102 are separately provided, the first pixel electrodes 204 of each pixel region 10 on same row are connected with one pixel driving line 203, and controlling transmittance of the perspective region 101 through the signal of the pixel driving line 203 when performing display.

Separately providing the first pixel electrode 204 of the perspective region 101 and the second pixel electrode 205 of the display region 102, the perspective region 101 and the display region 102 can be more easily controlled and adjusted; the first pixel electrode 204 and the pixel driving line 203 are connected, the signal inputted on the pixel driving line 203 is transmitted to the first pixel electrode 204, between the first pixel electrode 204 and the common electrode forms a voltage difference, flexibly controlling the light transmittance of a perspective region through controlling the voltage difference. For example, when the ambient light is darker or lighter, through adjusting the signal inputted in the pixel driving line 203, controlling the voltage difference in the proper range, in order to obtain the more satisfied transparent display effect, thereby avoiding the limitation of ambient light. The first pixel electrode 204 of each pixel electrode in the same row is connected with one pixel driving line 203, it can make the structure of the first substrate more compact and orderly.

Wherein the pixel opening area of the perspective region 101 is larger or equal than the pixel opening are of the display region 102. Through this way, which can further ensure the light transmittance of the prospective region to be able to achieve the users' requirements, further achieving the ideal prospective view effect.

The signals of the plurality of pixel driving lines 203 are the same. Specifically, the plurality of pixel driving lines 203 can be connected with each other in the peripheral region of the display panel, thus ensure the signals of the plurality of pixel driving lines 203 are the same.

Wherein the second substrate 30 comprises: a color photoresist layer, the color photoresist layer is formed on the second substrate 30, and is placed on the position corresponded with the display region 102 of the pixel region 10 on the first substrate 20.

Figure 5:
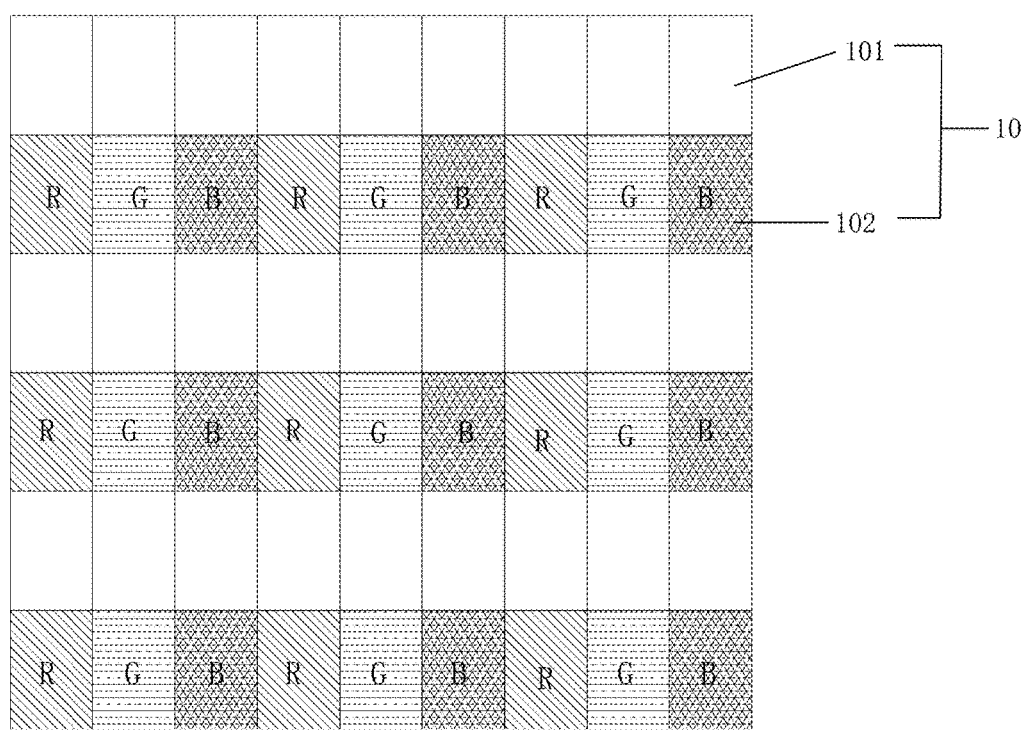
FIG. 5 is a schematic diagram of the display of a liquid crystal display panel using the present disclosure.

Refer to FIG. 4 and FIG. 5, each pixel region 10 also comprises: a switching component 206, the switching component 206 is provided on the first substrate 20, and it comprises: a gate electrode 2061, a source electrode 2062 and a drain electrode 2063, the gate electrode 2061 is electrically connected with a corresponded scan line 201; the source electrode 2062 is electrically connected with a corresponded data line 202; the drain electrode 2063 is electrically connected with the second pixel electrode 205 in the pixel region 10. The switching component can be a thin film transistor.

Furthermore, each pixel region 10 also comprises: a liquid crystal capacitance 207, the liquid crystal capacitance 207 is electrically connected with the drain electrode 2063 of the switching component 206.

Figure 1:
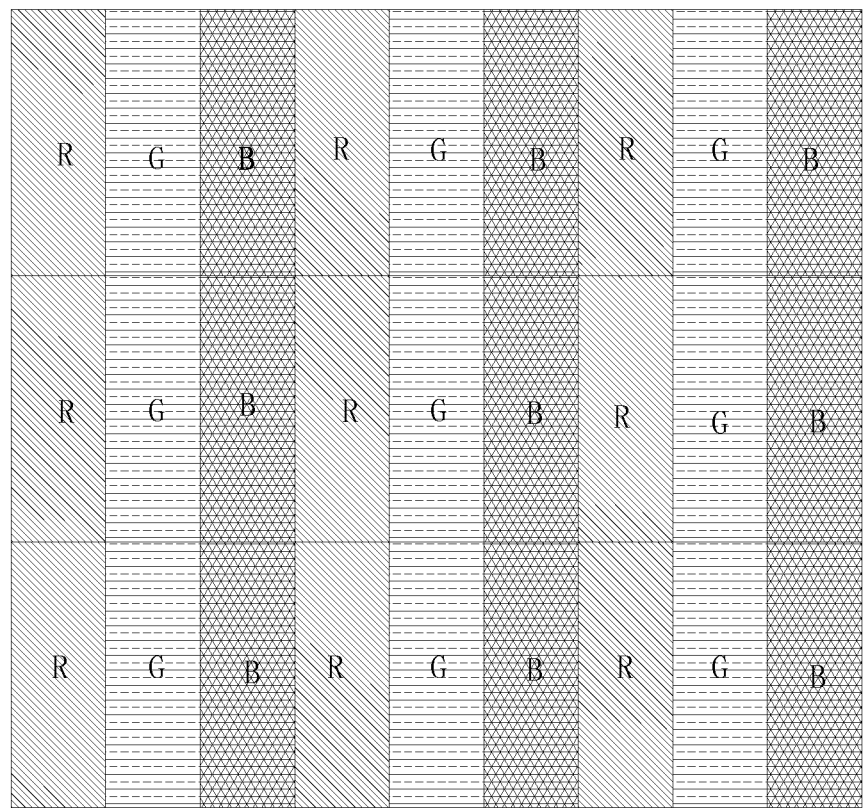
FIG. 1 is a schematic diagram of a transparent liquid crystal display in the prior art.
Figure 6:
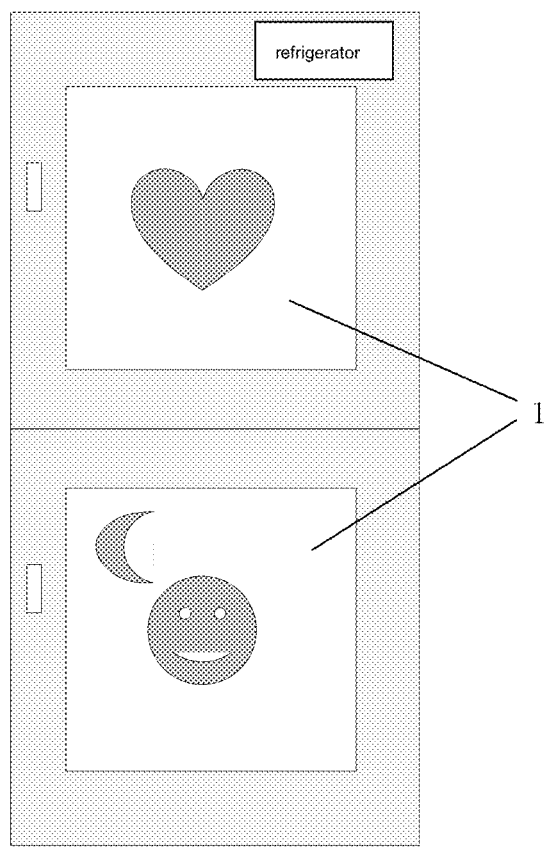
FIG. 6 is a schematic diagram that the display panel having a perspective function of the present disclosure is applied in the refrigerator.

Refer to FIG. 6, FIG. 6 is a schematic diagram that the display panel having a perspective function of the present disclosure is applied in the refrigerator, as shown in figure, even the refrigerator is closed, inside the refrigerator is dark, if adopting the transparent display panel as shown in FIG. 1, the effect of transparent display is also dark; however, using the transparent display panel 1 of the present disclosure, the signal inputted in the pixel driving line is transmitted to the first pixel electrode, between the first pixel electrode and the common electrode forms voltage difference, flexibly controlling the light transmittance of a perspective region through controlling the voltage difference, therefore, not only achieving the ideal effect of display, but also achieving the effect of transparent, the effect of transparent display will not be affected by the brightness inside the refrigerator.

The present disclosure also provides an array substrate, which is basically the same as the substrate used by the display panel described above, please refer to the instructions and the drawings of the above display panel for the detail, there is no more description.

Wherein the array substrate comprises a plurality of pixel region, wherein each pixel region respectively comprises a prospectively region a display region, wherein the perspective region of each pixel region is used to look a scene after the display panel, and the display region of each pixel region 10 is used to let the display panel provide a display function.

Through the above way, which can make the effects of perspective view and display diversification, to meet the multiple requirements of perspective view and display form users, and the transparent display effect can be adjusted, thereby achieving the ideal requirements of users.

Wherein the array substrate also comprises: a plurality of scan lines, a plurality of data lines and a plurality pixel driving lines, the plurality of data lines and the scan lines are intersected with each other in order to divide the display panel into the plurality of pixel regions; the plurality of pixel driving lines and the plurality of scan lines are provided in space; wherein the first pixel electrode of the perspective region of each pixel region and the second pixel electrode of the display region are separately provided, the first pixel electrodes of each pixel region on same row are connected with one pixel driving line, and controlling transmittance of the perspective region through the signal of the pixel driving line when performing display.

Wherein pixel opening area of the perspective region is larger or equal than pixel opening are of the display region.

Wherein signals of the plurality of pixel driving lines are the same.

Wherein each pixel region comprises: a switching component, the switching component is provided on the first substrate, and it comprises: a gate electrode, a source electrode and a drain electrode, the gate electrode is electrically connected with a corresponded scan line; the source electrode is electrically connected with a corresponded data line; the drain electrode is electrically connected with the second pixel electrode in the pixel region. Each pixel region further comprises: a liquid crystal capacitance, the liquid crystal capacitance is electrically connected with the drain electrode of the switching component.

The present disclosure also provides a display panel having perspective function, there are similarities between said display panel and the display panel described above, please refer to the instructions and the drawings of the above display panel for the detail, there is no more description.

The display panel also comprises: a first substrate, a second substrate and a liquid crystal layer. The first substrate and the second substrate are relatively provided; the liquid crystal layer is provided between the first substrate and the second substrate.

The first substrate comprises: a plurality of scan lines, a plurality data lines and a plurality of pixel driving lines. The plurality of scan lines are provided on the first substrate, the plurality of data lines are provided on the first substrate, and the plurality of data lines and the scan lines are intersected with each other in order to divide the display panel into the plurality of pixel regions; the plurality of pixel driving lines is provided on the first substrate, and the plurality of pixel driving lines and the plurality of scan lines are provided in space, the signals of the plurality of pixel driving lines are the same; wherein each pixel region respectively comprises a perspective region and a display region, the first pixel electrode of the perspective region of each pixel region 10 and the second pixel electrode of the display region are separately provided, the pixel opening area of the perspective region is larger or equal than the pixel opening area of the display region, the first pixel electrodes of each pixel region on same row are connected with one pixel driving line, and controlling transmittance of the perspective region through the signal of the pixel driving line when performing display.

Separately providing the first pixel electrode of the perspective region and the second pixel electrode of the display region, the perspective region and the display region can be more easily controlled and adjusted; the first pixel electrode and the pixel driving line are connected, the signal inputted on the pixel driving line is transmitted to the first pixel electrode, between the first pixel electrode and the common electrode forms a voltage difference, flexibly controlling the light transmittance of a perspective region through controlling the voltage difference. The first pixel electrode of each pixel electrode in the same row is connected with one pixel driving line, it can make the structure of the first substrate more compact and orderly. The pixel opening area of the perspective region is larger or equal than the pixel opening are of the display region, which can further ensure the light transmittance of the prospective region to be able to achieve the users' requirements, further achieving the ideal prospective view effect.

The preferred embodiments according to the present disclosure are mentioned above, which cannot be used to define the scope of the right of the present disclosure. Those variations of equivalent structure or equivalent process according to the present specification and the drawings or directly or indirectly applied in other areas of technology are considered encompassed in the scope of protection defined by the claims of the present disclosure.

What is claimed is:

1. A display panel having a perspective function, which comprises a plurality of pixel regions, wherein each pixel region respectively comprises a perspective region and a display region, wherein said perspective region of each pixel region is used to look a scene after said display panel, and said display region of each pixel region is used to let said display panel provide a display function;
   said display panel also comprising:
   a first substrate, which comprises:
     a plurality of scan lines, providing on said first substrate;
     a plurality of data lines, providing on said first substrate, and said plurality of data lines and said scan lines being intersected with each other in order to divide said display panel into said plurality of pixel regions;
     a plurality of pixel driving lines, providing on said first substrate, and said plurality of scan lines being provided in space;
   a second substrate, which is corresponded with said first substrate;
   a liquid crystal layer, which is provide between said first substrate and said second substrate;
   wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display, said pixel driving line is adjacent to the scanning line corresponding to said pixel region of the previous row and is disposed between the scanning line corresponding to said pixel region of the previous row and said first pixel electrode in said pixel region of the row;
   wherein signals of said plurality of pixel driving lines are the same;

wherein said second substrate comprises:
     a color photoresist layer, forming on said second substrate which is corresponded with said display region of said pixel region.

2. The display panel as claimed in claim 1, wherein pixel opening area of said perspective region is larger or equal than pixel opening are of said display region.

3. The display panel as claimed in claim 1, wherein said each pixel region comprises:
   a gate electrode, which is electrically connected with a corresponded scan line;
   a source electrode, which is electrically connected with a corresponded data line;
   a drain electrode, which is electrically connected with said second pixel electrode in said pixel region.

4. The display panel as claimed in claim 3, wherein said each pixel region further comprises:
   a liquid crystal capacitance, which is electrically connected with said drain electrode of said switching component.

5. An array substrate, wherein said array substrate comprises a plurality of pixel regions, wherein each pixel region respectively comprises a perspective region and a display region, wherein said perspective region of each pixel region is used to look a scene after said display panel, and said display region of each pixel region is used to let said display panel provide a display function; said array substrate also comprising:
   a plurality of scan lines;
   a plurality of data lines, said plurality of data lines and said scan lines being intersected with each other in order to divide said display panel into said plurality of pixel regions;
   a plurality of pixel driving lines, and said plurality of scan lines being provided in space;
   wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display;
   said pixel driving line is adjacent to the scanning line corresponding to said pixel region of the previous row and is disposed between the scanning line corresponding to said pixel region of the previous row and said first pixel electrode in said pixel region of the row.

6. The array substrate as claimed in claim 5, wherein pixel opening area of said perspective region is larger or equal than pixel opening are of said display region.

7. The array substrate as claimed in claim 5, wherein signals of said plurality of pixel driving lines are the same.

8. The array substrate as claimed in claim 5, wherein said each pixel region comprises:
   a gate electrode, which is electrically connected with a corresponded scan line;
   a source electrode, which is electrically connected with a corresponded data line;
   a drain electrode, which is electrically connected with said second pixel electrode in said pixel region.

9. The array substrate as claimed in claim 8, wherein said each pixel region further comprises:
   a liquid crystal capacitance, which is electrically connected with said drain electrode of said switching component.

10. A display panel having a perspective function, wherein it comprises:
- a first substrate, which comprises:
- a plurality of scan lines, providing on said first substrate;
- a plurality of data lines, providing on said first substrate, and said plurality of data lines and said scan lines being intersected with each other in order to divide said display panel into said plurality of pixel regions;
- a plurality of pixel driving lines, providing on said first substrate, and said plurality of scan lines being provided in space;
- a second substrate, which is corresponded with said first substrate;
- a liquid crystal layer, which is provide between said first substrate and said second substrate;
- wherein a first pixel electrode of said perspective region of each pixel region and a second pixel electrode of said display region are separately provided, said first pixel electrodes of each pixel region on same row are connected with one pixel driving line, and controlling transmittance of said perspective region through the signal of said pixel driving line when performing display; said pixel driving line is adjacent to the scanning line corresponding to said pixel region of the previous row and is disposed between the scanning line corresponding to said pixel region of the previous row and said first pixel electrode in said pixel region of the row.

11. The display panel as claimed in claim 10, wherein signals of said plurality of pixel driving lines are the same.

12. The display panel as claimed in claim 10, wherein said second substrate comprises:
- a color photoresist layer, forming on said second substrate which is corresponded with said display region of said pixel region.

13. The display panel as claimed in claim 10, wherein said each pixel region comprises:
- a gate electrode, which is electrically connected with a corresponded scan line;
- a source electrode, which is electrically connected with a corresponded data line;
- a drain electrode, which is electrically connected with said second pixel electrode in said pixel region.

14. The display panel as claimed in claim 13, wherein said each pixel region further comprises:
- a liquid crystal capacitance, which is electrically connected with said drain electrode of said switching component.

* * * * *